(12) United States Patent
Coco et al.

(10) Patent No.: US 12,240,180 B2
(45) Date of Patent: Mar. 4, 2025

(54) METHODS AND SYSTEMS FOR DETECTION OF IMPURITIES IN ADDITIVE MANUFACTURING MATERIAL

(71) Applicant: The Boeing Company, Chicago, IL (US)

(72) Inventors: Alexander J. Coco, Chicago, IL (US); Brianna K. Nord, Chicago, IL (US); Robert W. Grube, Seattle, WA (US); Emma Romig, Chicago, IL (US); Aaron C. Drollette, Chicago, IL (US); Eric M. Chapman, Chicago, IL (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 16/804,629

(22) Filed: Feb. 28, 2020

(65) Prior Publication Data
US 2021/0268740 A1 Sep. 2, 2021

(51) Int. Cl.
*B29C 67/00* (2017.01)
*B29C 64/393* (2017.01)
(Continued)

(52) U.S. Cl.
CPC ............ *B29C 64/393* (2017.08); *B33Y 10/00* (2014.12); *B33Y 30/00* (2014.12); *B33Y 50/02* (2014.12); *B29C 64/153* (2017.08)

(58) Field of Classification Search
CPC ..... B29C 64/153; B29C 64/393; B33Y 10/00; B33Y 30/00; B33Y 50/00; B33Y 50/02;
(Continued)

(56) References Cited

U.S. PATENT DOCUMENTS 3,817,628 A * 6/1974 Adams ................. G01N 21/474
356/407
9,952,236 B2 4/2018 Satzger et al.
(Continued)

FOREIGN PATENT DOCUMENTS

CN 106645161 A 9/2016
EP 3 257 608 A2 12/2017
(Continued)

OTHER PUBLICATIONS

Montazeri, "Smart Additive Manufacturing: In-Process Sensing and Data Analytics for Online Defect Detection in Metal Additive Manufacturing Processes" (Year: 2019).*
(Continued)

*Primary Examiner* — Ryan M Ochylski
(74) *Attorney, Agent, or Firm* — Yee & Associates, P.C.

(57) ABSTRACT

An example method for detection of impurities in additive manufacturing material includes illuminating, by a light source, a sample of additive manufacturing material with light, while illuminating the sample of the additive manufacturing material with light, causing a camera to acquire image data of the sample, and processing the image data to determine an amount of impurities in the sample of the additive manufacturing material. An example system for detection of impurities in additive manufacturing material includes a light source for illuminating a sample of additive manufacturing material with light, a camera for acquiring image data of the sample while illuminating the sample of the additive manufacturing material with light, and a computing device having one or more processors configured to execute instructions stored in memory for processing the image data to determine an amount of impurities in the sample of the additive manufacturing material.

20 Claims, 6 Drawing Sheets

(51) Int. Cl.
*B33Y 10/00* (2015.01)
*B33Y 30/00* (2015.01)
*B33Y 50/02* (2015.01)
B29C 64/153 (2017.01)

(58) Field of Classification Search
CPC ... G06T 7/0002; G06T 7/0004; G06T 7/0006; G06T 7/0008; G06T 7/001; G06T 7/13; G06T 7/90; G06T 9/002; G01N 21/88; G01N 21/8803; G01N 2021/8845; G01N 21/91; G01N 2021/8854; G01N 2021/8858; G01N 2021/888
See application file for complete search history.

(56) References Cited

U.S. PATENT DOCUMENTS

| | | | | |
|---|---|---|---|---|
| 2001/0026942 | A1* | 10/2001 | Carpenter | A61B 10/0096 |
| | | | | 436/17 |
| 2013/0070983 | A1* | 3/2013 | Rezaee | G06T 7/0012 |
| | | | | 382/128 |
| 2017/0017841 | A1* | 1/2017 | Chen | G06T 7/12 |
| 2017/0355143 | A1 | 12/2017 | Speckmann et al. | |
| 2018/0304549 | A1 | 10/2018 | Safai et al. | |
| 2020/0342597 | A1* | 10/2020 | Chukka | G06V 20/698 |
| 2022/0222803 | A1* | 7/2022 | Lin | G06T 7/337 |

FOREIGN PATENT DOCUMENTS

| | | | |
|---|---|---|---|
| JP | 4 355167 B2 | 10/2009 | |
| WO | WO-9516247 A1 * | 6/1995 | ........... G06T 7/0004 |
| WO | WO 2019/097222 A1 | 5/2019 | |
| WO | WO 2020/229838 A1 | 11/2020 | |

OTHER PUBLICATIONS

Mayank Goel et al., "HyperCam: Hyperspectral Imaging for Ubiquitous Computing Applications", UBICOMP, Sep. 7, 2015, pp. 145-156.

Extended European Search Report prepared by the European Patent Office in application No. EP 21 15 8262.2 dated Jul. 7, 2021.

Notification of the First Office Action issued by the Chinese Patent Office in application No. 2024081700191290 issued Aug. 17, 2024.

* cited by examiner

METHODS AND SYSTEMS FOR DETECTION OF IMPURITIES IN ADDITIVE MANUFACTURING MATERIAL

FIELD

The present disclosure relates generally to methods and systems for detection of impurities in additive manufacturing material, and more particularly to processing image data of a sample of additive manufacturing material to determine an amount of impurities in the sample of the additive manufacturing material.

BACKGROUND

A quality of powder used in additive manufacturing (AM) methods can affect a quality of parts built from it. Particle size factors influence flowability and thickness of each powder layer in a build box. For high-performance applications, it can be important to identify additional factors, such as types, numbers, and sizes of particulate contaminants that may be present in the powder. Contaminants may be introduced during powder manufacture, handling, or during the build process itself. Contaminants contained within a batch of powder can become introduced into a part when the contaminants are incorporated into the powder, and the contaminants can remain as discrete particulates or non-fused interfaces that act as stress concentrators.

A presence of contaminates may decrease a life of the part by increasing a likelihood of fatigue crack.

Currently, a human operator uses a microscope to review an additive manufacturing powder sample for foreign object debris (FOD) or contaminants. The human operator uses judgement to identify a quantitative count of FOD in a powder sample. This manual process is time-consuming and tedious, and prone to under-estimating an amount of FOD in an additive manufacturing powder sample.

SUMMARY

In an example, a method for detection of impurities in additive manufacturing material is described that includes illuminating, by a light source, a sample of additive manufacturing material with light, while illuminating the sample of the additive manufacturing material with light, causing a camera to acquire image data of the sample, and processing the image data to determine an amount of impurities in the sample of the additive manufacturing material.

In another example, a system for detection of impurities in additive manufacturing material is described that includes a light source for illuminating a sample of additive manufacturing material with light, a camera for acquiring image data of the sample while illuminating the sample of the additive manufacturing material with light, and a computing device having one or more processors configured to execute instructions stored in memory for processing the image data to determine an amount of impurities in the sample of the additive manufacturing material.

In still another example, an additive manufacturing system for detection of impurities in additive manufacturing material is described that includes an additive manufacturing machine for manufacturing a part using a supply of additive manufacturing material, a collector bin for storing remaining additive manufacturing material from the supply of additive manufacturing material following manufacturing of the part, a light source for illuminating a sample of the remaining additive manufacturing material with light, a camera for acquiring image data of the sample while illuminating the sample of the remaining additive manufacturing material with light, and a computing device having one or more processors configured to execute instructions stored in memory for processing the image data to determine an amount of impurities in the sample of the remaining additive manufacturing material.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods for detection of impurities in additive manufacturing material are described that include illuminating, by a light source, a sample of additive manufacturing material with light, and while illuminating the sample of the additive manufacturing material with light, causing a camera to acquire image data of the sample. Following, methods include processing the image data to determine an amount of impurities in the sample of the additive manufacturing material.

Using methods described herein enables automated detection of contamination, such as impurities and/or foreign object debris, in additive manufacturing materials via computer vision and image data processing techniques. Varying wavelengths of light are utilized to illuminate the samples of additive manufacturing materials, and high resolution images of the additive manufacturing materials can be acquired for processing.

Example methods and systems described herein can remove a need for a human operator to review additive manufacturing powder for contamination or foreign object debris, and enable more accurate identification and quantification of foreign object debris. The amount of foreign object debris in a sample of additive manufacturing material impacts quality and mechanical properties (for example, fatigue life and tensile strength) of a finished additively manufactured part. Thus, determination of an amount of the contamination can be useful in decisions for whether to replace the additive manufacturing material.

The example methods for detection of impurities in additive manufacturing material can be used in an additive manufacturing system, for example. An example additive manufacturing system can include an additive manufacturing machine for manufacturing a part using a supply of additive manufacturing material, a collector bin for storing remaining additive manufacturing material from the supply of additive manufacturing material following manufacturing of the part, a light source for illuminating a sample of the remaining additive manufacturing material with light, a camera for acquiring image data of the sample while illuminating the sample of the remaining additive manufacturing material with light, and a computing device having one or more processors configured to execute instructions stored in memory for processing the image data to determine an amount of impurities in the sample of the remaining additive manufacturing material. When the amount of impurities in the sample of the remaining additive manufacturing material exceeds a threshold, at least portions of the remaining additive manufacturing material can be replaced, for example, for further manufacturing of parts.

Figure 1:
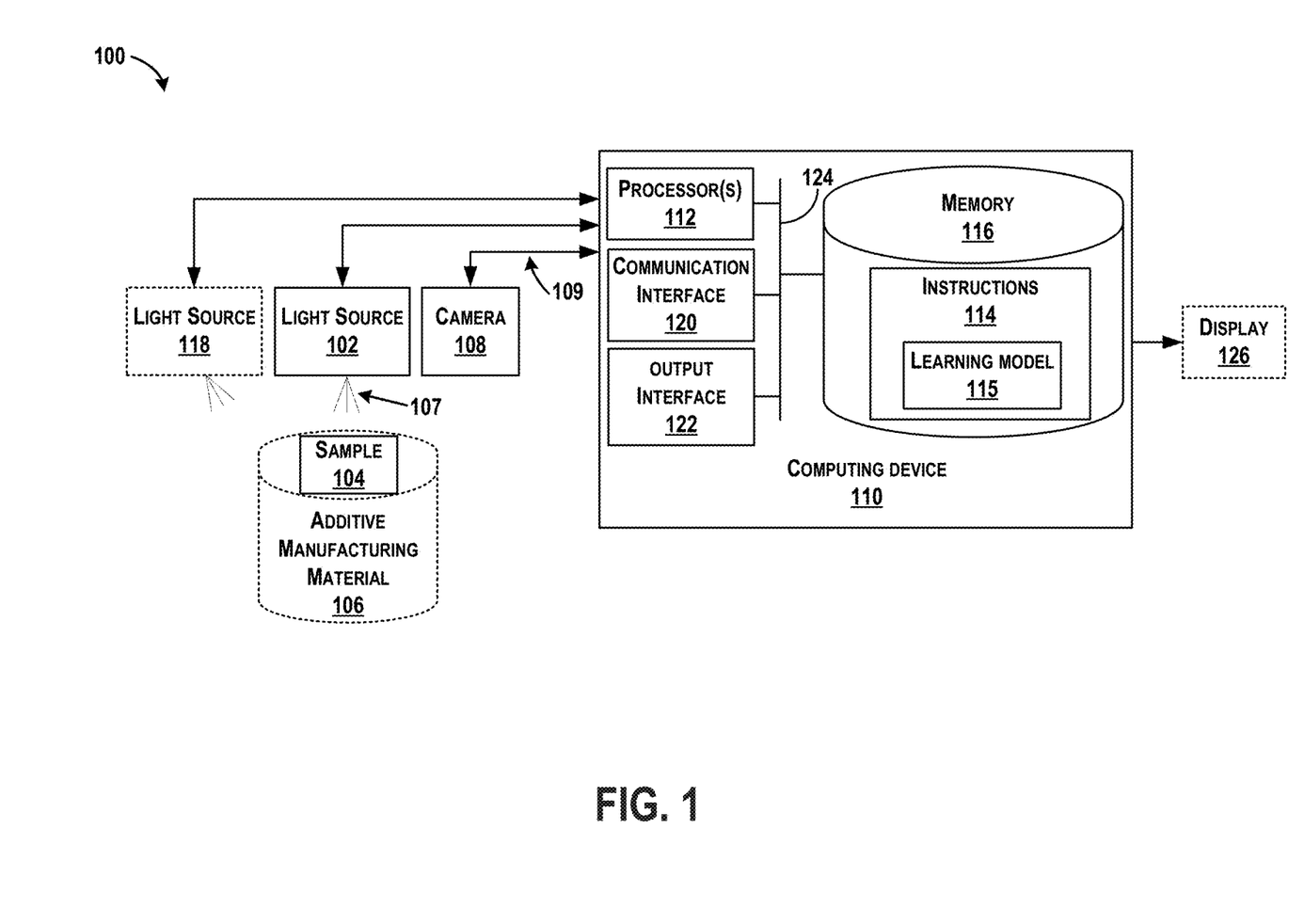
FIG. 1 illustrates a system for detection of impurities in additive manufacturing material, according to an example implementation.

Referring now to the figures, FIG. 1 illustrates a system 100 for detection of impurities in additive manufacturing material, according to an example implementation. The system 100 includes a light source 102 for illuminating a sample 104 of additive manufacturing material 106 with light 107, a camera 108 for acquiring image data 109 of the sample 104 while illuminating the sample 104 of the additive manufacturing material 106 with light 107, and a computing device 110 having one or more processors 112 configured to execute instructions 114 stored in memory 116 for processing the image data 109 to determine an amount of impurities in the sample 104 of the additive manufacturing material 106.

The light source 102 and the camera 108 are communicatively coupled to the computing device 110. For example, the light source 102 and the camera 108 may be in wired or wireless communication with the computing device 110. The computing device 110 can send instructions to and control operation of the light source 102 and the camera 108, and the light source 102 and the camera 108 can provide outputs to the computing device 110.

The light source 102 can include an Ultraviolet (UV) light source for illuminating the sample 104 with light having a wavelength in an UV spectrum. As an example, the light source 102 can illuminate the sample 104 with light having a wavelength between about 100 nanometers (nm) to about 500 nm.

Within examples, the system 100 can also include another light source 118. In this configuration, the light source 102 may be considered a first light source that illuminates the sample 104 of the additive manufacturing material 106 with light at a first wavelength and the light source 118 may be considered a second light source for illuminating the sample 104 of the additive manufacturing material 106 with light at a second wavelength. The first wavelength may be 100 nm and the second wavelength may be 385 nm, for example.

The additive manufacturing material 106 may be included within a container, and can include many types of materials, such as a polymer (e.g., polycarbonate, nylon, epoxy resin), a ceramic (silica or glass), and a metal (steel, titanium alloy, aluminum alloys, etc.), for example. The additive manufacturing material 106 can be in many forms as well, such as powder, liquid, or a combination.

The sample 104 of additive manufacturing material 106 may be a top layer of the additive manufacturing material 106, for example, such that the light source 102 illuminates the top layer and the camera 108 acquires image data of the sample 104. The light source 102 and the camera 108 can be mounted to illuminate the sample 104 and acquire the image data, and thus, the light source 102 and the camera 108 can be mounted over a container of the additive manufacturing material 106.

The camera 108 may be a hi-resolution camera for capturing images. In an example, the camera 108 acquires image data (or otherwise collect or obtains image data), which includes pixels or voxels. The camera 108 (or the computing device 110) may then generate or produce images based on the acquired image data. A representation of the sample 104 is then included in the images, for example.

The computing device 110 receives the image data from the camera 108, and processes the image data to determine an amount of impurities in the sample 104 of the additive manufacturing material 106. To perform the functions noted above, the computing device 110 includes a communication interface 120, an output interface 122, and each component of the computing device 110 is connected to a communication bus 124. The computing device 110 may also include hardware to enable communication within the computing device 110 and between the computing device 110 and other devices (not shown). The hardware may include transmitters, receivers, and antennas, for example.

The communication interface 120 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 120 may be configured to receive input data from one or more devices, and may also be configured to send output data to other devices.

The memory 116 may take the form of non-transitory computer readable media, such as one or more computer-readable storage media that can be read or accessed by the one or more processors 112. The computer-readable storage media can include volatile and/or non-volatile storage components, such as optical, magnetic, organic or other memory or disc storage, which can be integrated in whole or in part with the one or more processors 112. The memory 116 can thus be considered non-transitory computer readable media. In some examples, the memory 116 can be implemented using a single physical device (e.g., one optical, magnetic, organic or other memory or disc storage unit), while in other examples, the memory 116 can be implemented using two or more physical devices.

The memory 116 thus is a computer readable medium, and the instructions 114 are stored thereon. The instructions 114 include computer executable code.

The one or more processors 112 may be general-purpose processors or special purpose processors (e.g., digital signal processors, application specific integrated circuits, etc.). The one or more processors 112 may receive inputs from the communication interface 120, and process them to generate outputs that are stored in the memory 116. The one or more processors 112 can be configured to execute the instructions 114 (e.g., computer-readable program instructions) that are stored in the memory 116 and are executable to provide the functionality of the computing device 110 described herein.

The output interface 122 outputs information for reporting or storage, and thus, the output interface 122 may be similar to the communication interface 120 and can be a wireless interface (e.g., transmitter) or a wired interface as well.

The computing device 110 and/or the processors 112 can output data indicative of the amount of impurities in the sample 104 of the remaining additive manufacturing material 106 to a display 126.

Within examples, in operation, when the instructions 114 are executed by the one or more processors 112 of the computing device 110, the one or more processors 112 are caused to perform functions for receiving the image data from the camera 108, and processing the image data to determine an amount of impurities in the sample 104 of the additive manufacturing material 106. The instructions 114 may further include a learning model 115 constructed by supervised learning using training images that is executable to automatically process and identify an amount of impurities in the sample 104 of the additive manufacturing material 106, as described below.

FIGS. 2-7 illustrate conceptual images based on image data acquired by the camera of the sample 104 of the additive manufacturing material 106, according to an example implementation. The images shown in FIGS. 2-7 are conceptual and the additive manufacturing material 106 has had impurities added for illustrative purposes only. Thus, in FIGS. 2-7, images are shown of artificially modified additive manufacturing material. Each of the images shown in FIGS. 2-7 is representative of the same sample 104 of the additive manufacturing material 106 with the sample 104 being illuminated using a different wavelength of light in each image.

Figure 2:
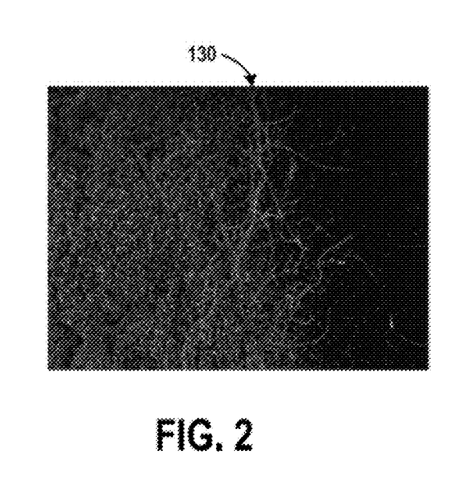
FIG. 2 illustrates a conceptual image based on image data acquired by the camera of the sample of the additive manufacturing material, according to an example implementation.
Figure 3:
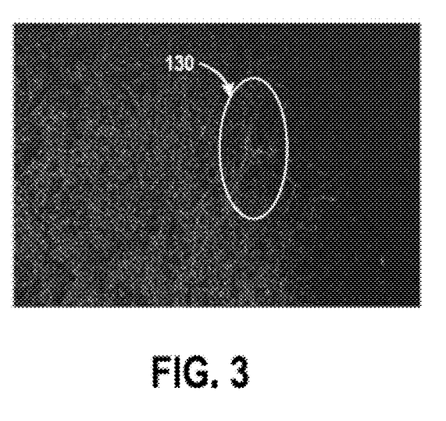
FIG. 3 illustrates another conceptual image based on image data acquired by the camera of the sample of the additive manufacturing material, according to an example implementation.
Figure 4:
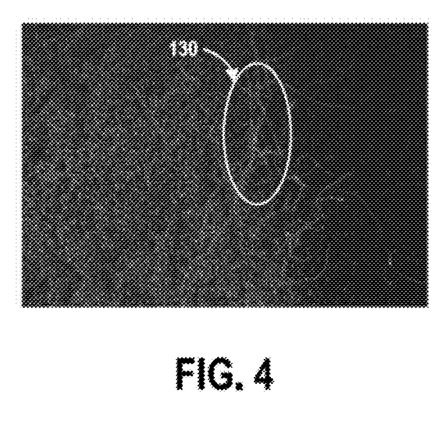
FIG. 4 illustrates another conceptual image based on image data acquired by the camera of the sample of the additive manufacturing material, according to an example implementation.
Figure 5:
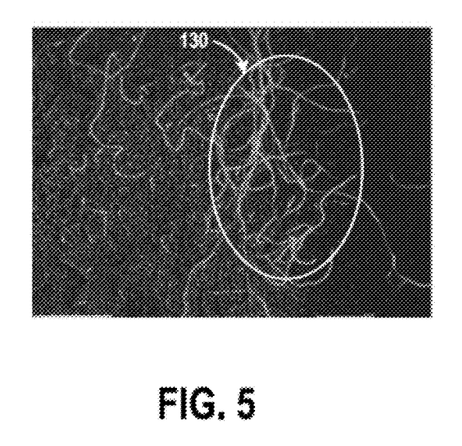
FIG. 5 illustrates another conceptual image based on image data acquired by the camera of the sample of the additive manufacturing material, according to an example implementation.
Figure 6:
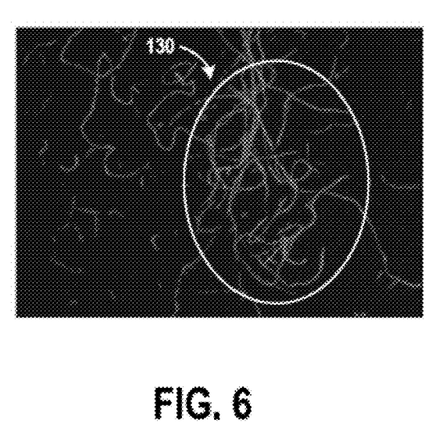
FIG. 6 illustrates another conceptual image based on image data acquired by the camera of the sample of the additive manufacturing material, according to an example implementation.
Figure 7:
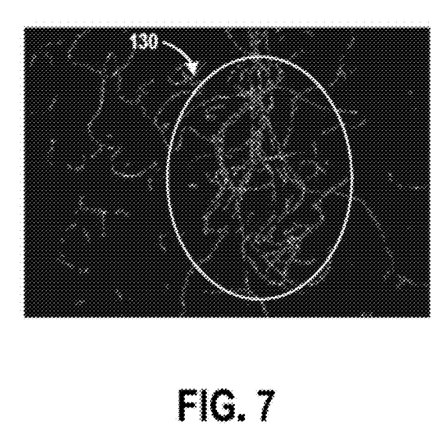
FIG. 7 illustrates another conceptual image based on image data acquired by the camera of the sample of the additive manufacturing material, according to an example implementation.

In FIG. 2, a first image is shown that was acquired by the camera 108 while illuminating the sample 104 of the additive manufacturing material 106 with UV light. Dark areas in the image are representative of additive manufacturing material that does not include impurities. In the image, impurities 130 are shown as glowing curved lines. Within examples, the impurities include fiber object debris that may fall into the additive manufacturing material following completion of a part. When illuminated by UV light, the fiber object debris are easily identifiable in the images.

FIGS. 3-7 illustrate additional images acquired by the camera 108 while illuminating the sample 104 of the additive manufacturing material 106 with UV light. Each of the additional images may be acquired by illuminating the sample 104 of the additive manufacturing material 106 with UV light at different wavelengths. As seen, using different wavelengths provides somewhat different results, and the impurities 130 can be detected by processing these images.

An assessment of an amount of impurities in the sample 104 of the additive manufacturing material 106 can be made by calculating a fraction of an area in the image that includes impurities vs. an area in the image that does not include impurities.

In some examples, some types of impurities may not be visible when illuminated by certain wavelengths of light, and thus, multiple images can be acquired while illuminating at multiple different wavelengths of light. Thus, within examples, the camera 108 acquires first image data of the sample 104 while illuminating the sample 104 of the additive manufacturing material 106 with light at the first wavelength, and then the camera 108 acquires second image data of the sample 104 while illuminating the sample 104 of the additive manufacturing material 106 with light at the second wavelength.

The computing device 110 processes the first image data and the second image data to determine the amount of impurities in the sample 104 of the additive manufacturing material 106. The computing device 110 may process the first image data and second image data to determine the amount of impurities in the sample 104 of the additive manufacturing material 106 by determining a first amount of impurities based on processing the first image data, determining a second amount of impurities based on processing the second image data, and adding the first amount of impurities and the second amount of impurities.

In some examples, only one light source is used, and the sample 104 of the additive manufacturing material 106 can be illuminated with light at different wavelengths by varying the wavelength of light by the light source 102 to illuminate the sample 104 of the additive manufacturing material 106 with multiple different wavelengths of light. Then, the camera 108 can acquire multiple image data of the sample 104 while illuminating at each of the multiple different wavelengths of light, and the computing device 110 can process the multiple image data to determine the amount of impurities in the sample 104 of the additive manufacturing material 106.

Many different computer vision methods may be used to process the image data for identification of the impurities in the image data. Examples include edge detection, color extraction, and Laplacian operators to reliably distinguish impurities from additive manufacturing material.

Figure 8:
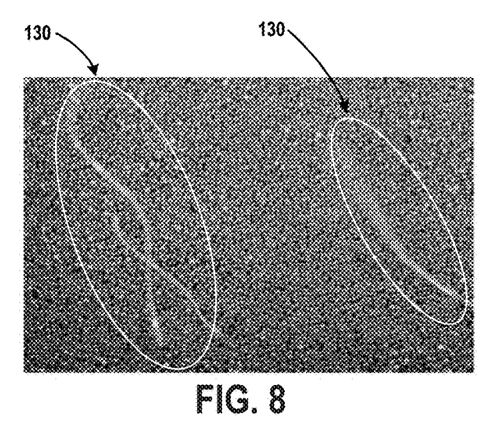
FIG. 8 illustrates another example of an image acquired by the camera while illuminating the sample of the additive manufacturing material with UV light, according to an example implementation.

FIG. 8 illustrates another example of an image acquired by the camera 108 while illuminating the sample 104 of the additive manufacturing material 106 with UV light, according to an example implementation. The impurities 130 are circled in the image for illustration purposes.

Figure 9:
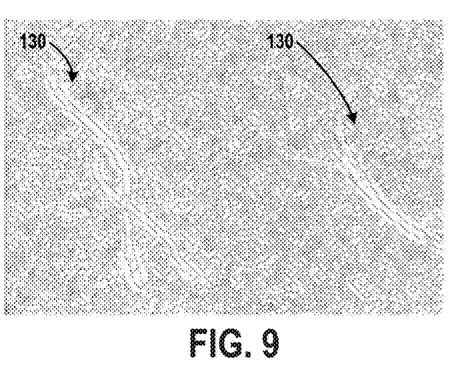
FIG. 9 illustrates an output of an image processing technique applied to the image of FIG. 8, according to an example implementation.

FIG. 9 illustrates an output of an image processing technique applied to the image of FIG. 8, according to an example implementation. In one example edge detection image processing technique can be used to identifying points in the image at which image brightness changes by a threshold amount or has discontinuities. Points at which image brightness changes sharply are typically organized into a set of curved line segments referred to as edges. When the sample 104 of the additive manufacturing material 106 is illuminated by UV light, the impurities 130 will fluoresce with greater intensity than the additive manufacturing material 106, and the impurities 130 can be detected in the images using edge detection and image brightness change techniques.

In FIG. 9, outlines of the impurities 130 result from processing the image of FIG. 8 using edge detection processes.

Figure 10:
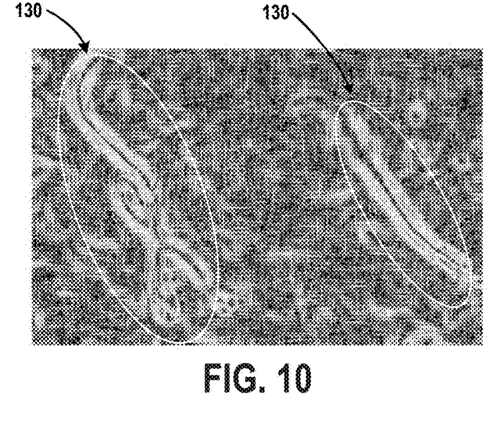
FIG. 10 illustrates another example of an image acquired by the camera while illuminating the sample of the additive manufacturing material with UV light, according to an example implementation.

FIG. 10 illustrates another example of an image acquired by the camera 108 while illuminating the sample 104 of the additive manufacturing material 106 with UV light, according to an example implementation. The impurities 130 are circled in the image for illustration purposes.

Figure 11:
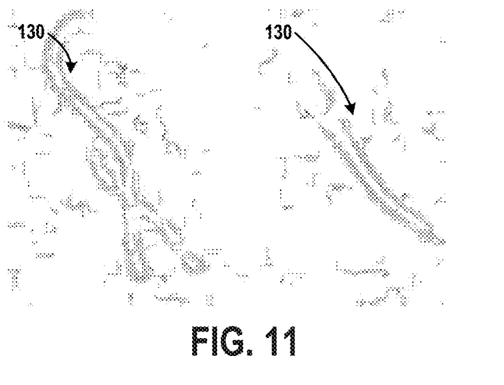
FIG. 11 illustrates an output of an image processing technique applied to the image of FIG. 10, according to an example implementation.

FIG. 11 illustrates an output of an image processing technique applied to the image of FIG. 10, according to an example implementation. In FIG. 11, outlines of the impurities 130 result from processing the image of FIG. 10 using edge detection processes.

Figure 12:
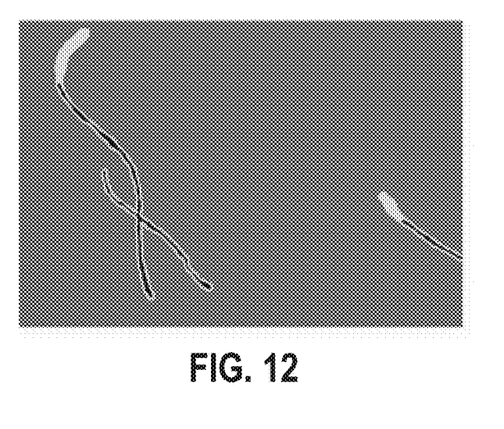
FIG. 12 illustrates an example image mask, according to an example implementation.

FIG. 12 illustrates an example image mask, according to an example implementation. The mask can be generated using image segmentation, i.e., each pixel of the image is given a label (debris, background, etc.). Thus, a learning model constructed by supervised learning using training images based on manually identified impurities is implemented to process images, and then train a neural network to output a pixel-wise mask of the images. The learning model may be stored in the memory 116, and take the form of a portion of the instructions 114, for example.

The example mask shown in FIG. 12 results from processing the images shown in FIGS. 9 and 11, for example. Once the mask is generated, a percentage of the sample 104 of the additive manufacturing material 106 that include impurities can be calculated using pixels correlated to fiber object debris. Individual pixels of the image will be labeled as fiber object debris or not, using image segmentation. Following creation of a training set of images, classifications of pixels can be determined by processed the edge detected images.

Figure 13A:
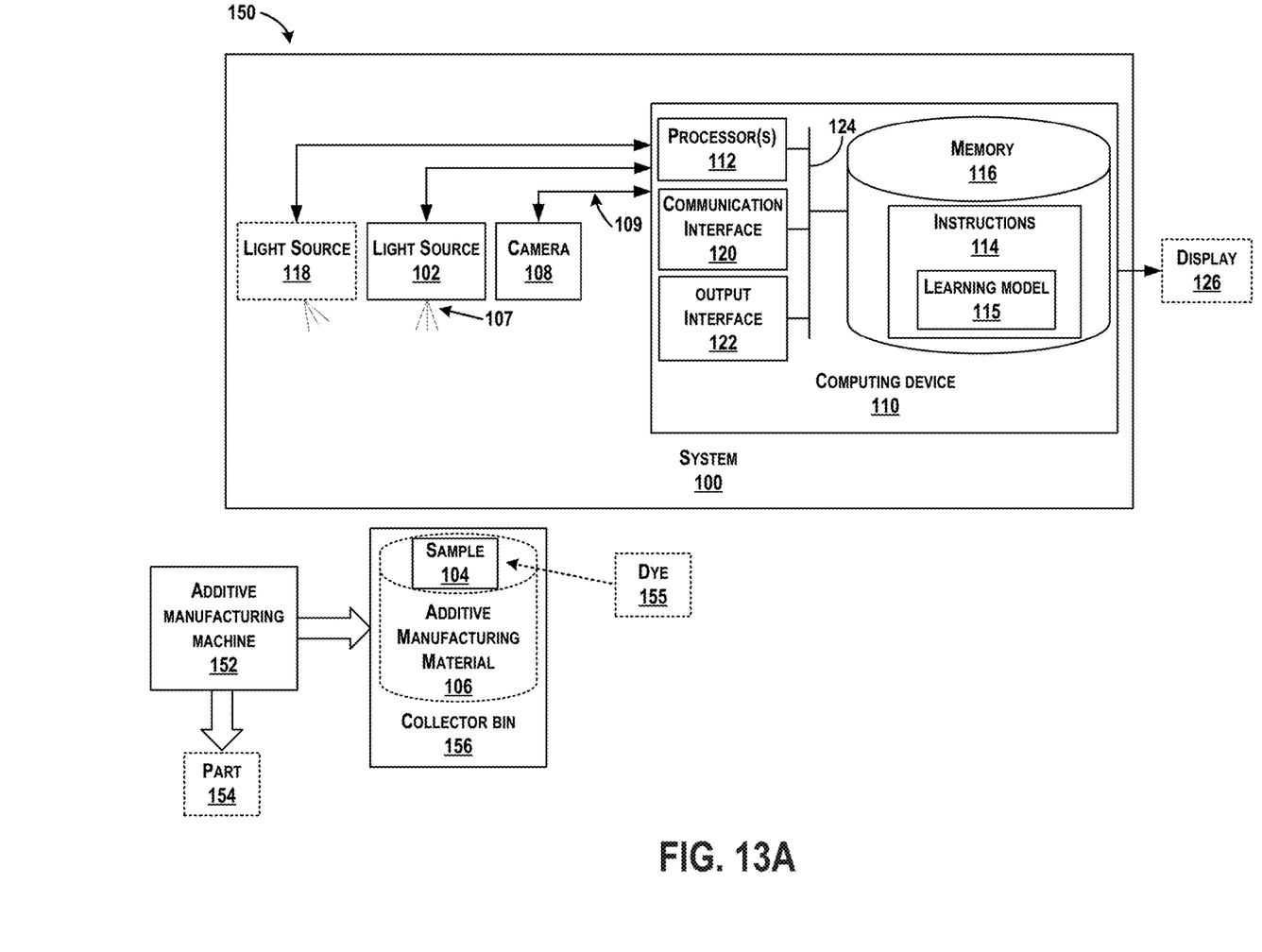
FIG. 13A illustrates an example of an additive manufacturing system for detection of impurities in additive manufacturing material, according to an example implementation.

FIG. 13A illustrates an example of an additive manufacturing system 150 for detection of impurities in additive manufacturing material, according to an example implementation. The additive manufacturing system includes an additive manufacturing machine 152 for manufacturing a part 154 using a supply of the additive manufacturing material 106, and a collector bin 156 for storing remaining additive manufacturing material from the supply of additive manufacturing material 106 following manufacturing of the part.

The additive manufacturing system 150 further includes the system 100 for detection of impurities in the additive manufacturing material 106 shown in FIG. 1. Thus, the additive manufacturing system 150 includes the light source 102 for illuminating the sample 104 of the remaining additive manufacturing material with light, the camera 108 for acquiring image data of the sample 104 while illuminating the sample of the remaining additive manufacturing material with light, and the computing device 110 having the one or more processors 112 configured to execute the instructions 114 stored in the memory 116 for processing the image data to determine an amount of impurities in the sample 104 of the remaining additive manufacturing material.

The remaining additive manufacturing material can be gathered following completion of a part, e.g., a bed of the additive manufacturing machine 152 raises up and a vacuum gathers all loose powder into the collector bin 156. In this example, the light source 102 and the camera 108 can be mounted over the collector bin 156 for illuminating samples and acquiring image data.

The additive manufacturing machine 152 operates by manufacturing parts in a layer-wise construction of a plurality of layers of material. Additive manufacturing may involve applying liquid or powder material to a work area, and then performing a combination of sintering, curing, melting, and/or cutting to create a layer. The process is repeated up to several thousand times to construct a desired finished part. The additive manufacturing machine 152 may include components, such as a printing head or printer nozzle, control mechanisms (e.g., computing device), molds, etc., depending on a type of manufacturing being used. A range of processes finding industrial applications for additive manufacturing includes direct metal deposition, electron beam melting, polymer processes such as fused filament fabrication (FFF), fused deposition (FDM), Solid Ground Curing (SGC), Laminated Object Manufacturing (LOM), and select laser sintering (SLS) or selective laser melting (SIM), among others. The additive manufacturing machine 152 may include components specific to any of these processes, or in some examples, the additive manufacturing machine 152 may include hybrid machine tools to combine additive manufacturing with subtractive machining.

The part 154 produced using the additive manufacturing machine 152 is built up by laying down a layer of material on a build platform layer-by-layer. This process provides properties comparable to that of a casting.

The additive manufacturing system 150 can utilize the methods described herein in many useful ways. As one example, based on the amount of impurities in the sample 104 of the remaining additive manufacturing material, the computing device 110 may determine to recycle the remaining additive manufacturing material for use in manufacturing a subsequent part. For instance, the light source 102 illuminates a top layer of the remaining additive manufacturing material in the collector bin 156, and if the impurities are below a threshold, it is determined that the remaining additive manufacturing material in the collector bin 156 may be reused for subsequent parts. In this example, the remaining additive manufacturing material can be added back into a storage container including the additive manufacturing material 106.

For example, powder of the additive manufacturing material 106 is collected in the collector bin 156, and UV light (e.g., at 385 nm) is used to illuminate a top layer of the collector bin 156 to identify impurities. Ideally, the powder would remain clean, however, impurities may be introduced during the build process. The additive manufacturing system 150 thus can include the computing device 110 incorporated therein to automatically analyze the remaining additive manufacturing material. An example output of the analysis is a count of impurities (e.g., 100 parts per million of probable contaminants), and if the threshold is 200 ppm, this sample of remaining additive manufacturing material qualifies for further usage.

In other examples, based on the amount of impurities and a location of the impurities being in a top layer of the remaining additive manufacturing material, the computing device 110 may determine to remove the top layer of the remaining additive manufacturing material and provide a new layer of additive manufacturing material. As an example, an area on a build platform may be recoated with a new layer of additive manufacturing material. In this example, removal of the top layer can be performed manually or via machine components, and additional additive manufacturing material 106 can be added as needed.

Figure 13B:
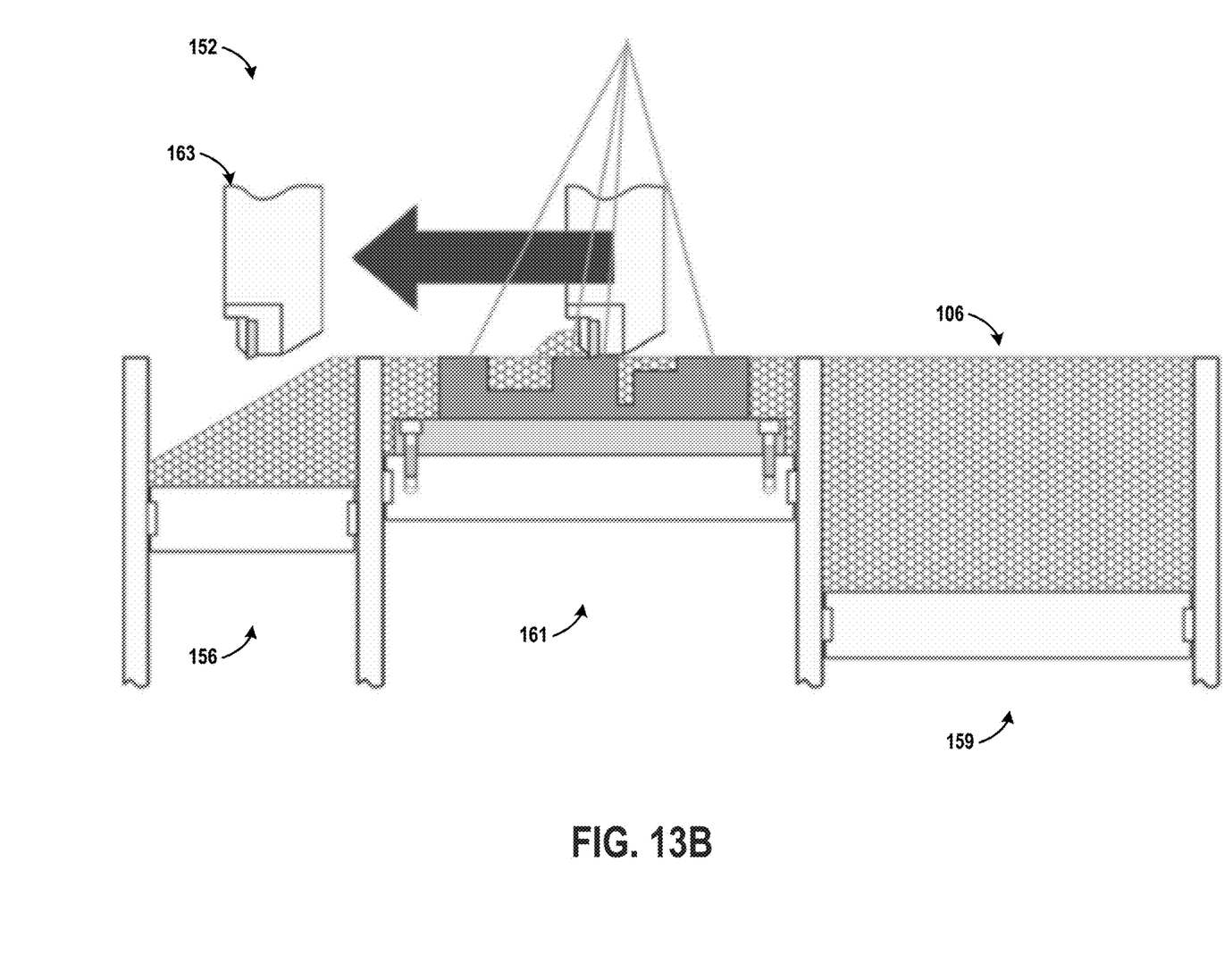
FIG. 13B illustrates an example of the additive manufacturing machine, according to an example implementation.

FIG. 13B illustrates an example of the additive manufacturing machine 152, according to an example implementation. The additive manufacturing machine 152 in this example includes a storage container 159 holding the additive manufacturing material 106, a build platform 161 upon which the part 154 is built, and the container bin 156 into which the remaining additive manufacturing material is vacuumed using a vacuum mechanism 163. When impurities are detected in the remaining manufacturing material, new manufacturing material from the storage container 159 can be provided onto the build platform 161, for example.

Within these examples, the computing device 110 determines if the remaining additive manufacturing material is of a quality that will allow for a successful build.

Figure 14:
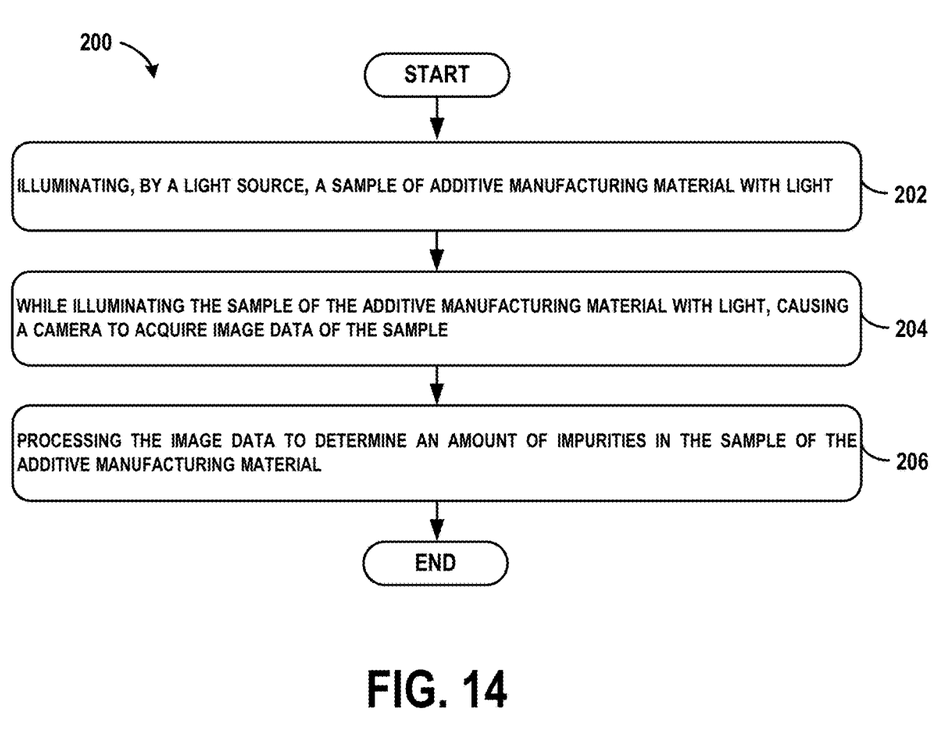
FIG. 14 shows a flowchart of an example of a method for detection of impurities in additive manufacturing material, according to an example implementation.

FIG. 14 shows a flowchart of an example of a method 200 for detection of impurities in additive manufacturing material, according to an example implementation. Method 200 shown in FIG. 14 presents an example of a method that could be used with the system 100 shown in FIG. 1, with the additive manufacturing system 150 shown in FIG. 13, or with the computing device 110 shown in FIGS. 1 and 13, for example. Further, devices or systems may be used or configured to perform logical functions presented in FIG. 14. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 14, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes illuminating, by the 102 light source, the sample 104 of the additive manufacturing material 106 with light. Within an example, this includes illuminating the sample 104 with light having a wavelength in an Ultraviolet spectrum, or illuminating the sample 104 with light having a wavelength between about 100 nanometers (nm) to about 500 nm.

Within other examples, functions at block 202 include varying the wavelength of light by the light source 102 to illuminate the sample 104 of the additive manufacturing material 106 with multiple different wavelengths of light.

At block 204, the method 200 includes while illuminating the sample 104 of the additive manufacturing material 106 with light, causing the camera 108 to acquire image data of the sample 104.

In some examples, block 204 includes causing the camera 108 to acquire multiple image data of the sample 104 while illuminating at each of the multiple different wavelengths of light.

At block 206, the method 200 includes processing the image data to determine an amount of impurities in the sample of the additive manufacturing material. In an example, block 206 includes calculating a fraction of the image data containing the impurities.

In some examples, when multiple different wavelengths of light are used, block 206 can include processing the multiple image data acquired at the multiple different wavelengths of light to determine the amount of impurities in the sample 104 of the additive manufacturing material 106.

In further examples, block 206 can include using a learning model constructed by supervised learning using training images based on manually identified impurities.

In further examples, the method 200 can include illuminating the sample 104 of the additive manufacturing material 106 with a first light source at a first wavelength and causing the camera 108 to acquire first image data of the sample, illuminating the sample 104 of the additive manufacturing material 106 with a second light source at a second wavelength and causing the camera 108 to acquire second image data of the sample, and processing the first image data and the second image data to determine the amount of the impurities in the sample 104 of the additive manufacturing material 106. The function of processing may include determining a first amount of impurities based on processing the first image data, determining a second amount of impurities based on processing the second image data and adding the first amount of impurities and the second amount of impurities.

In further examples, the method 200 can include applying a dye 155 to the sample 104 of the additive manufacturing material 106 prior to illuminating the sample 104 of the additive manufacturing material 106. The dye 155 may be useful to bind to fiber particles and not to metals, for example, and can cause certain wavelengths of light to reflect and/or fluoresce light more easily, for example. FIG. 13, for example, illustrates the dye 155 as an optional component to add to the sample 104.

Using example methods and systems described herein enables eliminating a human operator for analyzing impurities in a batch of additive manufacturing material, and instead using computer vision to identify impurities and FOD. The computer vision techniques further enable quantification of an amount of impurities (per million powder particles). Computer vision techniques can be performed more quickly and eliminates human judgement, therefore increasing chances for a more accurate count of impurities.

Further, manufacturers employing powder-based additive manufacturing can utilize example methods and system described herein to define a stable and repeatable process used to determine if additive manufacturing powder contains impurities above a threshold.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for detection of impurities in additive manufacturing material during forming of a mechanical part, the method comprising:
   illuminating, by a first light source and a second light source controlled by a computing device, a top layer of the additive manufacturing material with light during forming of the mechanical part;
   while illuminating the top layer of the additive manufacturing material with light provided by the first light source at a first wavelength between 100 nanometers (nm) and 500 nm, causing a camera to acquire first image data of the top layer;
   while illuminating the top layer with light provided by the second light source at a second wavelength outside the first wavelength, causing the camera to acquire second image data of the additive manufacturing material;
   processing, using a learning model, the first image data and the second image data to determine an amount of impurities in the top layer, wherein the learning model is generated by supervised learning using training images based on manually identified impurities and uses edge detection, color extraction, and Laplacian operators to reliably distinguish impurities from additive manufacturing material;
   generating, using a neural network, a pair of pixel-wise masks based on the first image data and the second image data, wherein individual pixels of at least one image of the first image data and at least one image of the second image data are assigned a debris label or a non-debris label;
   based on the debris and/or non-debris labels represented by the pair of pixel-wise masks, calculating a percentage of the top layer that includes impurities;
   performing, by the computing device, a comparison between the percentage of the top layer that includes impurities and a predefined threshold; and
   based on the comparison, causing, by the computing device, one or more machine components to remove the top layer and trigger a new layer of different additive manufacturing material to be added to the mechanical part.

2. The method of claim 1, wherein processing the first image data and the second image data to determine the amount of the impurities in the top layer comprises:
   determining a first amount of impurities based on processing the first image data;
   determining a second amount of impurities based on processing the second image data; and
   adding the first amount of impurities and the second amount of impurities.

3. The method of claim 1, wherein illuminating the top layer with light comprises varying a wavelength of light by the first light source to illuminate the top layer with multiple different wavelengths of light from the first light source, wherein the multiple different wavelengths are in a wavelength range between 100 nm and 500 nm.

4. The method of claim 3, further comprising:
   causing the camera to acquire multiple image data of the top layer while illuminating at each of the multiple different wavelengths of light; and
   processing the multiple image data and the second image data to determine the amount of impurities in the top layer.

5. The method of claim 1, wherein processing the first image data and the second image data to determine the amount of impurities in the top layer comprises calculating a fraction of the first image data and the second image data containing the impurities.

6. The method of claim 1, further comprising:
applying a dye to the top layer prior to illuminating the top layer.

7. The method of claim 1, wherein the first wavelength is between 100 nm and 200 nm.

8. The method of claim 1, further comprising:
recoating an area on a build platform with the new layer of different additive manufacturing material.

9. The method of claim 1, further comprising:
based on the comparison, determining that the percentage of the top layer that includes impurities exceeds the predefined threshold; and
based on determining that the percentage of the top layer that includes impurities exceeds the predefined threshold, causing the one or more machine components to remove the top layer.

10. The method of claim 1, wherein the edge detection is configured to identify points in image data at which image brightness changes by a threshold amount.

11. The method of claim 1, wherein the top layer corresponds to a remaining additive manufacturing material stored in a collector bin.

12. The method of claim 1, further comprising:
displaying output data via a display interface, wherein the output data indicates an amount of impurities in the top layer, wherein the amount of impurities is represented in per million powder particle units.

13. A system for detection of impurities in additive manufacturing material during forming of a mechanical part, the system comprising:
a first light source and a second light source for illuminating a top layer of the additive manufacturing material with light during forming of the mechanical part, wherein the first light source is configured to provide light at a first wavelength range between 100 nanometers (nm) and 500 nm and the second light source is configured to provide light at a second wavelength outside the first wavelength range;
a camera for acquiring first image data of the top layer while illuminating the top layer with light provided by the first light source and second image data of the top layer while illuminating the top layer with light provided by the second light source; and
a computing device having one or more processors configured to execute instructions stored in memory to perform operations comprising:
processing the first image data and the second image data using a learning model to determine an amount of impurities in the top layer, wherein the learning model is generated by supervised learning using training images based on manually identified impurities and uses edge detection, color extraction, and Laplacian operators to reliably distinguish impurities from additive manufacturing material;
generating, using a neural network, a pair of pixel-wise masks based on the first image data and the second image data, wherein individual pixels of at least one image of the first image data and at least one image of the second image data are assigned a debris label or a non-debris label;
based on the debris and/or non-debris labels represented by the pair of pixel-wise masks, calculating a percentage of the top layer that includes impurities;
performing a comparison between the percentage of the top layer that includes impurities and a predefined threshold; and
based on the comparison, causing one or more machine components to remove the top layer and trigger a new layer of different additive manufacturing material to be added to the mechanical part.

14. The system of claim 13, wherein the computing device processes the first image data and second image data to determine the amount of impurities in the top layer by:
determining a first amount of impurities based on processing the first image data;
determining a second amount of impurities based on processing the second image data; and
adding the first amount of impurities and the second amount of impurities.

15. An additive manufacturing system for detection of impurities in additive manufacturing material during manufacturing of a part, the system comprising:
an additive manufacturing machine for manufacturing the part using a supply of additive manufacturing material;
a collector bin for storing remaining additive manufacturing material from the supply of additive manufacturing material following manufacturing of at least a portion of the part;
a first light source and a second light source for illuminating a top layer of the additive manufacturing material with light during forming of the part, wherein the first light source is configured to provide light at a first wavelength range between 100 nanometers (nm) and 500 nm and the second light source is configured to provide light at a second wavelength outside the first wavelength range;
a camera for acquiring first image data of the additive manufacturing material while illuminating the top layer with light provided by the first light source and second image data of the top layer while illuminating the top layer with light provided by the second light source; and
a computing device having one or more processors configured to execute instructions stored in memory to perform operations comprising:
processing the first image data and the second image data using a learning model to determine an amount of impurities in the top layer, wherein the learning model is generated by supervised learning using training images based on manually identified impurities and uses edge detection, color extraction, and Laplacian operators to reliably distinguish impurities from additive manufacturing material;
generating, using a neural network, a pair of pixel-wise masks based on the first image data and the second image data, wherein individual pixels of at least one image of the first image data and at least one image of the second image data are assigned a debris label or a non-debris label;
based on the debris and/or non-debris labels represented by the pair of pixel-wise masks, calculating a percentage of the top layer that includes impurities;
performing a comparison between the percentage of the top layer that includes impurities and a predefined threshold; and
based on the comparison, causing one or more machine components to remove the top layer and trigger a new layer of different additive manufacturing material to be added to the part.

16. The additive manufacturing system of claim 15, wherein the top layer corresponds to a sample of remaining additive manufacturing material, and wherein based on the amount of impurities in the sample of the remaining additive manufacturing material, the computing device determining to recycle the remaining additive manufacturing material for use in manufacturing a subsequent part.

17. The additive manufacturing system of claim 15, wherein the first light source and the second light source illuminates a top layer of the remaining additive manufacturing material in the collector bin.

18. The additive manufacturing system of claim 15, wherein based on the amount of impurities and a location of the impurities being in a top layer of the remaining additive manufacturing material, the computing device determining to remove the top layer of the remaining additive manufacturing material and providing a new layer of additive manufacturing material.

19. The additive manufacturing system of claim 15, wherein the first light source illuminates the top layer with light comprises varying wavelengths of light to illuminate the top layer with multiple different wavelengths of light.

20. The additive manufacturing system of claim 19, wherein the camera acquires multiple image data of the top layer while illuminating at each of the multiple different wavelengths of light, and wherein the computing device processes the multiple image data and the second image data to determine the amount of impurities in the top layer.

* * * * *